United States Patent
Ahmed (10) Patent No.: US 12,544,735 B1
(45) Date of Patent: Feb. 10, 2026

(54) CALCIUM METABORATE/LEAD TETROXIDE/MAGNESIUM BORATE/CARBON NANOCOMPOSITE AND METHOD OF PREPARATION

(71) Applicant: IMAM MOHAMMAD IBN SAUD ISLAMIC UNIVERSITY, Riyadh (SA)

(72) Inventor: Ehab Abdelhamed Abdelrahman Ahmed, Riyadh (SA)

(73) Assignee: IMAM MOHAMMAD IBN SAUD ISLAMIC UNIVERSITY, Riyadh (SA)

( * ) Notice: Subject to any disclaimer, the term of this patent is extended or adjusted under 35 U.S.C. 154(b) by 0 days.

(21) Appl. No.: 19/271,627

(22) Filed: Jul. 16, 2025

(51) Int. Cl.
   *B01J 20/06* (2006.01)
   *B01J 20/20* (2006.01)
   (Continued)

(52) U.S. Cl.
   CPC ............. *B01J 20/06* (2013.01); *B01J 20/205* (2013.01); *B01J 20/28007* (2013.01); *B01J 20/28016* (2013.01); *B01J 20/3028* (2013.01); *B01J 20/3078* (2013.01); *B01J 20/3085* (2013.01); *C02F 1/288* (2013.01); *C02F 1/281* (2013.01); *C02F 2101/22* (2013.01); *C02F 2101/306* (2013.01); *C02F 2101/308* (2013.01); *C02F 2101/327* (2013.01); *C02F 2101/345* (2013.01)

(58) Field of Classification Search
   None
   See application file for complete search history.

(56) References Cited

U.S. PATENT DOCUMENTS

| | | | |
|---|---|---|---|
| 2005/0003744 A1 | 1/2005 | Feng et al. | |
| 2011/0217543 A1* | 9/2011 | Suetsuna | H01F 1/0063 977/773 |
| 2019/0264101 A1* | 8/2019 | Pousthomis | C03C 1/008 |

FOREIGN PATENT DOCUMENTS

| | | | |
|---|---|---|---|
| CN | 107694518 A | * 2/2018 | B01J 20/20 |
| CN | 114956031 B | 10/2023 | |

OTHER PUBLICATIONS

Ramesha et al. (Sensors and Actuators B, 2011, 160, 306-311). (Year: 2011).*

(Continued)

*Primary Examiner* — Clare M Perrin
(74) *Attorney, Agent, or Firm* — Oblon, McClelland, Maier & Neustadt, L.L.P.

(57) ABSTRACT

A $CaB_2O_4/Pb_3O_4/Mg_3B_2O_6/C$ nanocomposite that includes orthorhombic calcium metaborate ($CaB_2O_4$), tetragonal lead tetroxide ($Pb_3O_4$), magnesium borate ($Mg_3B_2O_6$), and carbon (C). The $CaB_2O_4/Pb_3O_4/Mg_3B_2O_6/C$ nanocomposite includes 55 to 70 atomic percent (at. %) oxygen (O), 5.0 to 12.5 at. % calcium (Ca), 7.5 to 15 at. % magnesium (Mg), 7.5 to 15 at. % lead (Pb), 2.5 to 7.5 at. % boron (B), and 2.5 to 7.5 at. % carbon (C), each based on a total number of atoms in the $CaB_2O_4/Pb_3O_4/Mg_3B_2O_6/C$ nanocomposite. The nanocomposite is used in a method of removing organic pollutants and/or heavy metals from water.

19 Claims, 4 Drawing Sheets

(51) Int. Cl.
*B01J 20/28* (2006.01)
*B01J 20/30* (2006.01)
*C02F 1/28* (2023.01)
*C02F 101/22* (2006.01)
*C02F 101/30* (2006.01)
*C02F 101/32* (2006.01)
*C02F 101/34* (2006.01)

(56) References Cited

OTHER PUBLICATIONS

Yang et al. (Electrochimica Acta, 2017, 235, 409-421). (Year: 2017).*
Weeks et al. (J. Electrochem. Soc., 2020, 167, 060509). (Year: 2020).*
Ahmad et al. (Microchemical Journal, 2021, 160, 105679). (Year: 2021).*
Jia et al. (Tribology International, 2015, 90, 240-247). (Year: 2015).*
Liu et al. (Polymers, 2018, 10, 625). (Year: 2018).*
Mohandoss et al. (Sensors and Actuators A, 2019, 285, 158-164). (Year: 2019).*
Rajakovic et al. (Carbon, 1996, 34, 769-774). (Year: 1996).*
Ghasemi et al. (J Mater Sci, 2014, 49, 1014-1024). (Year: 2014).*
Hu et al. (Advanced Functional Materials, 2018, 28, 1705294). (Year: 2018).*
Hashemi et al. (Radiation Physics and Chemistry, 2018, 146, 77-85). (Year: 2018).*
Muhammad et al. (Physics Open, 2025, 25, 100313). (Year: 2025).*
Al-Wasidi et al. (Molecules, 2024, 14, 3392). (Year: 2024).*
Machine translation of CN 107694518 A, pp. 1-10. (Year: 2018).*
Nada S. Al-Kadhi, et al., "Facile synthesis of MgO/ZnO nanocomposite for efficient removal of alizarin red S dye from aqueous media", Inorganic Chemistry Communications, vol. 162, Apr. 2024, 112233, Excerpts only, 5 pages.
Hamed Roghani, et al., "Phase and morphology studies of B4C—SiC nanocomposite powder synthesized by MASHS method in B2O3, Mg, C and Si system", Advanced Powder Technology, vol. 26, Issue 4, May 26, 2015, pp. 1116-1122.

* cited by examiner

CALCIUM METABORATE/LEAD TETROXIDE/MAGNESIUM BORATE/CARBON NANOCOMPOSITE AND METHOD OF PREPARATION

BACKGROUND

Technical Field

The present disclosure is directed to a nanocomposite that includes calcium metaborate ($CaB_2O_4$), lead tetroxide ($Pb_3O_4$), magnesium borate ($Mg_3B_2O_6$), and carbon (C) useful for removing organic pollutants from water and a method of its formation.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

In recent years, significant attention has been given to a variety of nanomaterials due to their unique properties and potential applications in fields like catalysis, environmental remediation, and electronics. Metal borates, such as calcium and magnesium borates, offer excellent thermal stability and chemical resistance, while metal oxides like lead oxide or zinc oxide contribute redox activity, semiconducting behavior, and high surface reactivity. However, despite their individual advantages, single phase systems often suffer from critical limitations. They typically lack the multifunctionality needed for complex applications. Further, a single phase material may possess a desirable property hampered by one or more undesirable properties, such as low stability, limited activity, limited tunability, or difficulty in integration with other conventional materials and processes.

To address these limitations, researchers have begun exploring the design of multiphase nanocomposites that integrate multiple distinct nanomaterials into a single nanocomposite. These hybrid nanocomposites combine the beneficial features of each component. For example, the thermal and mechanical stability of metal borates, the electronic and catalytic activity of metal oxides, and the electrical conductivity, surface area, and flexibility of carbon materials like graphene or amorphous carbon can be combined to form a robust nanocomposite useful in a variety of applications. The integration of these components enables enhanced charge transport, improved durability, and greater functionality, making them suitable for a wide range of advanced applications, including photocatalysis, supercapacitors, batteries, and environmental sensors. Furthermore, the multiphase structure allows for better control over material properties, offering the potential for customizable performance based on specific application needs. Despite challenges in achieving uniform phase distribution and strong interfacial bonding, advancements in energy-efficient and scalable synthesis methods are accelerating progress. As a result, multiphase nanocomposites are emerging as a promising platform for next-generation functional materials.

However, the design, preparation, and control of such nanocomposites is challenging. There are difficulties in achieving phase control, size control, and integration of the various materials into a single composite. It can be exceedingly difficult to prepare a nanocomposite with the correct mixture of phases with good integration. One preparation route may produce good integration but an undesirable mixture of phases while another preparation route may produce the desired phases with no size control or integration. Many conventional synthesis techniques, such as solid-state and hydrothermal methods, do not offer precise control over morphology or composition, limiting the development of high-performance nanomaterials.

Accordingly, one object of the present disclosure provide a nanocomposite that includes multiple metal oxide and metal borate phases.

SUMMARY

According to a first aspect, the present disclosure relates to a $CaB_2O_4/Pb_3O_4/Mg_3B_2O_6/C$ nanocomposite. In some embodiments, the $CaB_2O_4/Pb_3O_4/Mg_3B_2O_6/C$ nanocomposite includes orthorhombic calcium metaborate ($CaB_2O_4$), tetragonal lead tetroxide ($Pb_3O_4$), magnesium borate ($Mg_3B_2O_6$), and carbon (C). In some embodiments, the $CaB_2O_4/Pb_3O_4/Mg_3B_2O_6/C$ nanocomposite includes 55 to 70 atomic percent (at. %) oxygen (O), 5.0 to 12.5 at. % calcium (Ca), 7.5 to 15 at. % magnesium (Mg), 7.5 to 15 at. % lead (Pb), 2.5 to 7.5 at. % boron (B), and 2.5 to 7.5 at. % carbon (C), each based on a total number of atoms in the $CaB_2O_4/Pb_3O_4/Mg_3B_2O_6/C$ nanocomposite.

In some embodiments, the $CaB_2O_4/Pb_3O_4/Mg_3B_2O_6/C$ nanocomposite has an average crystallite size of 40 to 90 nanometers (nm) by X-ray diffraction (XRD).

In some embodiments, the $CaB_2O_4/Pb_3O_4/Mg_3B_2O_6/C$ nanocomposite is in the form of aggregates, including rod-shaped particles.

In some embodiments, the rod-shaped particles have a mean rod length of 0.25 to 2.5 micrometers (μm) and a mean rod diameter of 0.05 to 1 μm.

In some embodiments, the $CaB_2O_4/Pb_3O_4/Mg_3B_2O_6/C$ nanocomposite is in the form of aggregates, including plate-shaped particles.

In some embodiments, the plate-shaped particles have a mean plate length of 0.25 to 2.5 μm, a mean plate width of 0.25 to 2.5 μm, and a mean plate thickness of 0.05 to 1 μm.

In some embodiments, the carbon in the $CaB_2O_4/Pb_3O_4/Mg_3B_2O_6/C$ nanocomposite is present as a carbon nanomaterial which is at least one selected from the group consisting of carbon nanotubes, carbon nanobuds, carbon nanoscrolls, carbon dots, activated carbon, carbon black, graphene, graphene oxide, reduced graphene oxide, and nanodiamonds.

The present disclosure also relates to a method of forming the $CaB_2O_4/Pb_3O_4/Mg_3B_2O_6/C$ nanocomposite. In some embodiments, the method includes mixing an alpha hydroxy carboxylic acid solution, including an alpha hydroxy carboxylic acid in water with a metal solution including a Mg ion source, a Ca ion source, a Pb ion source, boric acid ($H_3BO_3$), and water to form a precursor mixture. In some embodiments, the method further includes adding to the precursor mixture a polyether to form a reaction mixture. In some embodiments, the method further includes heating the reaction mixture to 200 to 300 degrees Celsius (° C.) to form a solid intermediate product and finally calcining the solid intermediate product at 400 to 800° C. to form the $CaB_2O_4/Pb_3O_4/Mg_3B_2O_6/C$ nanocomposite.

In some embodiments, the alpha hydroxy carboxylic acid is tartaric acid ($C_4H_6O_6$).

In some embodiments, the Mg ion source is magnesium nitrate ($Mg(NO_3)_2$).

In some embodiments, the calcium ion source is calcium nitrate ($Ca(NO_3)_2$).

In some embodiments, the lead ion source is lead nitrate ($Pb(NO_3)_2$).

In some embodiments, the polyether is polyethylene glycol having a mean molecular weight of 400 grams per mole (g/mol).

In some embodiments, the reaction mixture has a weight ratio of $C_4H_6O_6$ to a total of the Mg ion source, Ca ion source, and Pb ion source of 0.25:1 to 1:1.

The present disclosure also relates to a method of removing a pollutant from water. In some embodiments, the method includes contacting contaminated water with the $CaB_2O/Pb_3O/Mg_3B_2O_6/C$ nanocomposite and thereby forming a contaminated nanocomposite and collecting a purified water.

In some embodiments, the pollutant is an organic pollutant, which is at least one selected from the group consisting of a dye, a phenol, a polycyclic aromatic hydrocarbon, an herbicide, a pesticide, and a persistent organic pollutant. wherein the organic pollutant is at least one selected from the group consisting of a dye, a phenol, a polycyclic aromatic hydrocarbon, an herbicide, a pesticide, and a persistent organic pollutant.

In some embodiments, the pollutant is a heavy metal, which is at least one selected from the group consisting of lead (Pb), cadmium (Cd), arsenic (As), chromium (Cr), nickel (Ni), copper (Cu), and zinc (Zn).

In some embodiments, the pollutant is present in the contaminated water in an amount of 0.01 to 10,000 parts per million (ppm).

In some embodiments, the method removes 70 to 99.9% of an initial amount of pollutants present in the contaminated water.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

When describing the present disclosure, the terms used are to be construed in accordance with the following definitions, unless a context dictates otherwise.

Embodiments of the present invention will now be described more fully hereinafter with reference to the accompanying drawings wherever applicable, in that some, but not all, embodiments of the disclosure are shown.

In the drawings, like reference numerals designate identical or corresponding parts throughout the several views. Further, as used herein, the words 'a', 'an', and the like generally carry a meaning of 'one or more', unless stated otherwise.

As used herein, the words "about," "approximately," or "substantially similar" may be used when describing magnitude and or position to indicate that the value and/or position described is within a reasonable expected range of values and/or positions. For example, a numeric value may have a value that is +/−0.1% of the stated value (or range of values), +/−1% of the slated value (or range of values), +/−2% of the stated value (or range of values), +/−5% of the slated value (or range of values), +/−10% of the staled value (or range of values), +/−15% of the stated value (or range of values), or +/−20% of the stated value (or range of values). Within the description of this disclosure, where a numerical limit or range is stated, the endpoints are included unless stated otherwise. Also, all values and subranges within a numerical limit or range are specifically included as if explicitly written out.

As used herein, the term 'room temperature' refers to a temperature range of '25 degrees Celsius (° C.)±3° C. in the present disclosure.

As used herein, the term 'nanomaterial' refers to materials with structural features at the nanoscale (1-1000 nanometers (nm)) that exhibit unique physical, chemical, and mechanical properties compared to their bulk counterparts.

As used herein, the term 'carbon nanomaterial' refers to a class of nanostructured materials composed primarily of carbon atoms, exhibiting exceptional mechanical, electrical, thermal, and chemical properties.

As used herein, the term 'nanocomposite' refers to a composite material that has at least one component with a grain size measured in nanometers.

As used herein, the term 'crystallite size' refers to the average size of a crystal domain within a material.

As used herein the term 'average crystallite size' refers to the average size of the individual crystallites (small crystalline regions) that make up a polycrystalline material.

As used herein, the term 'aggregates' refers to the clumping of individual particles into larger aggregates or clusters, a process that significantly influences their physical and chemical properties. This phenomenon may be driven by several factors, including high surface energy, van der Waals forces, and electrostatic interactions, as well as the properties of the surrounding solvent, such as pH and ionic strength.

As used herein, the term 'amount' refers to the proportion or presence of a particular substance, component, or element within a larger system. It can be quantified in various ways, such as percentage, concentration, or mass. The content of an element refers to its proportion or concentration within a given material, mixture, or compound. It can be expressed in various units such as atomic percent (at. %), weight percent (wt. %), or mole fraction.

An at. % of a component, unless specifically stated to the contrary, is based on the total number of atoms in the formulation or composition in which the component is included. For example, if a particular element or component in a composition or article is said to have 5 at. %, it is understood that this percentage represents the proportion of that element relative to a total atomic composition of 100 at. %.

The present disclosure is intended to include all hydration states of a given compound or formula, unless otherwise noted or when heating a material.

In addition, the present disclosure is intended to include all isotopes of atoms occurring in the present compounds and complexes. Isotopes include those atoms having the same atomic number but different mass numbers. By way of general example, and without limitation, isotopes of hydrogen include deuterium and tritium. Isotopes of boron include $^{10}$B and $^{11}$B. Isotopes of carbon include $^{13}$C and $^{14}$C. Isotopes of oxygen include $^{16}$O, $^{17}$O, and $^{18}$O. Naturally occurring isotopes of magnesium include $^{24}$Mg, $^{25}$Mg, and $^{26}$Mg. Naturally occurring isotopes of calcium include $^{40}$Ca, $^{42}$Ca, $^{43}$Ca, $^{44}$Ca, $^{46}$Ca, and $^{48}$Ca. Naturally occurring isotopes of lead include $^{204}$Pb, $^{206}$Pb, $^{207}$Pb, and $^{208}$Pb. Isotopically labeled compounds of the disclosure may generally be prepared by conventional techniques known to those skilled in the art or by processes analogous to those described herein, using an appropriate isotopically-labeled reagent in place of the non-labeled reagent otherwise employed.

As used herein, the term 'pollutants' refers to a substance introduced into the environment that have undesired or even detrimental consequences. Pollutants can take various forms, including chemicals, particles, biological materials, or energy, that negatively affect the air, water, soil, or living organisms. These substances may arise from human activities, such as industrial processes, agricultural practices, and waste disposal, or from natural events like wildfires and volcanic eruptions.

As used herein, the term 'organic pollutant' refers to carbon-based chemical compounds that persist in the environment, contaminate air, water, and soil, and pose serious health risks to humans and wildlife. These pollutants originate from industrial, agricultural, and domestic activities, with some being biodegradable while others persist for decades. Among organic pollutants, dyes, phenols, polycyclic aromatic hydrocarbons (PAHs), herbicides, pesticides, and persistent organic pollutants (POPs) are major contaminants, each with distinct sources and harmful effects.

A dye is a colored substance that chemically binds to a material it may be intended to color. Generally, a dye is applied in a solution, typically an aqueous solution. Examples of dyes include, but are not limited to: acridine dyes, which are acridine and its derivatives such as acridine orange, acridine yellow, acriflavine, and gelgreen; anthraquinone dyes, which are anthroaquinone and its derivatives such as acid blue 25, alizarin, anthrapurpurin, carminic acid, 1,4-diamno-2,3-dihydroanthraquinone, 7,14-dibenzypyrenequinone, dibromoanthrone, 1,3-dihydroxyanthraquinone, 1,4-dihydroxyanthraquinone, disperse red 9, disperse red 11, indanthrone blue, morindone, oil blue 35, parietin, quinizarine green SS, remazol brilliant blue R, solvent violet 13, 1,2,4-trihydroxyanthraquinone, vat orange 1, and vat yellow 1; diaryl methane dyes such as auramine O, triarylmethane dyes such as acid fuchsin, aluminon, aniline blue WS, aurin, aurintricarboxylic acid, brilliant blue FCF, brilliant green, bromocresol green, bromocresol purple, bromocresol blue, bromophenol blue, bromopyrogallol red, chlorophenol red, coomassie brilliant blue, cresol red, O-cresolphthalein, crystal violet, dichlorofluorescein, ethyl green, fast green FCT, FIAsH-EDT2, fluoran, fuchsine, green S, light green SF, malachite green, merbromin, metacresol purple, methyl blue, methyl violet, naphtholphthalein, new fuchsine, pararosaniline, patent blue V, phenol red, phenolphthalein, phthalein dye, pittacal, spirit blue, thymol blue, thymolphthalein, Victoria blue BO, Victoria blue R, water blue, xylene cyanol, and xylenol orange; azo dyes such as acid orange 5, acid red 13, alican yellow, alizarine yellow R, allura red AC, amaranth, amido black 10OB, aniline yellow, arylide yellow, azo violet, azorubine, basic red 18, biebrich scarlet, Bismarck brown Y, black 7984, brilliant black BN, brown FK, chrysoine resorcinol, citrus red 2, congo red, D&C red 33, direct blue 1, disperse orange 1, eriochrome black T, evans blue, fast yellow AB, orange 1, hydroxynaphthol blue, janus green B, lithol rubine BK, metanil yellow, methyl orange, methyl red, methyl yellow, mordant brown 33, mordant red 19, naphthol AS, oil red O, oil yellow DE, orange B, orange G, orange GGN, para red, pigment yellow 10, ponceau 2R, prontosil, red 2G, scarlet GN, Sirius red, solvent red 26, solvent yellow 124, sudan black B, sudan I, sudan red 7B, sudan stain, tartrazine, tropaeolin, trypan blue, and yellow 2G; phthalocyanine dyes such as phthalocyanine blue BN, phthalocyanine Green G, Alcian blue, and naphthalocyanine, azin dyes such as basic black 2, mauveine, neutral red, Perkin's mauve, phenazine, and safranin; indophenol dyes such as indophenol and dichlorophenolindophenol; oxazin dyes; oxazone dyes; thiazine dyes such as azure A, methylene blue, methylene green, new methylene blue, and toluidine blue; thiazole dyes such as primuline, stains-all, and thioflavin; xanthene dyes such as 6-carboxyfluorescein, eosin B, eosin Y, erythosine, fluorescein, rhodamine B, rose bengal, and Texas red; fluorone dyes such as calcein, carboxyfluorescein diacetate succinimidyl ester, fluo-3, fluo-4, indian yellow, merbromin, pacific blue, phloxine, and seminaphtharhodafluor; or rhodamine dyes such as rhodamine, rhodamine 6G, rhodamine 123, rhodamine B, sulforhodamine 101, and sulforhodamine B.

A phenol is an organic compound including of a hydroxyl group (—OH) bonded directly to an aromatic hydrocarbon group. Examples of phenols include, but are not limited to, phenol (the namesake of the group of compounds), bisphenols (including bisphenol A), butylated hydroxytoluene (BHT), 4-nonylphenol, orthophenyl phenol, picric acid, phenolphthalein and its derivatives mentioned above, xylenol, diethylstilbestrol, L-DOPA, propofol, butylated hydroxyanisole, 4-tert-butylcatechol, tert-butylhydroquinone, carvacrol, chloroxyleol, cresol (including M-, O-, and P-cresol), 2,6-di-tert-butylphenol, 2,4-dimethyl-6-tert-butylphenol, 2-ethyl-4,5-dimethylphenol, 4-ethylguaiacol, 3-ethylphenol, 4-ethylphenol, flexirubin, mesitol, 1-nonyl-4-phenol, thymol, 2,4,6-tri-tert-butylphenol, chlorophenol (including 2-, 3-, and 4-chlorophenol), dichlorophenol (including 2,4- and 2,6-dichlorophenol), bromophenol, dibromophenol (including 2,4-dibromophenol), nitrophenol, norstictic acid, oxybenzone, and paracetamol (also known as acetaminophen).

A polycyclic aromatic hydrocarbon (PAH) is an aromatic hydrocarbon composed of multiple aromatic rings. Examples of polycyclic aromatic hydrocarbons include naphthalene, anthracene, phenanthrene, phenalene, tetracene, chrysene, triphenylene, pyrene, pentacene, benzo[a]pyrene, corannulene, benzo[g,h,i]perylene, coronene, ovalene, benzo[c]fluorine, acenaphthene, acenaphthylene, benz[a]anthracene, benzo[b]fluoranthene, benzo[j]fluoranthene, benzo[k]fluoranthene, benzo[e]pyrene, cyclopenta[c,d]pyrene, dibenz[a,h]anthracene, dibenzo[a,e]pyrene, dibenzo[a,h]pyrene, dibenzo[a,i]pyrene, dibenzo[a,l]pyrene, fluoranthene, fluorine, indeno[1,2,3-c,d]pyrene, 5-methylchrysene, naphthacene, pentaphene, picene, and biphenylene.

An herbicide (also known as "weedkiller") is a substance that is toxic to plants and may kill, inhibit the growth of, or prevent the germination of plants. Herbicides are typically used to control the growth of or remove unwanted plants from an area of land, particularly in an agricultural context. Examples of herbicides include, but are not limited to, 2,4-D, aminopyralid, chlorsulfuron, clopyralid, dicamba, diuron, glyphosate, hexazinone, imazapic, imazapyr, methsulfuron methyl, picloram, sulfometuron methyl, triclopyr, fenoxaprop, fluazifop, quizalofop, clethodim, sethoxydim, chlorimuron, foramsulfuron, halosulfuron, nicosulfuron, primisulfuron, prosulfuron, rimsulfuron, thofensulfuron, tribenuron, imazamox, imazaquin, flumetsulam, cloransulam, thiencarbazone, fluoxpyr, diflufenzopyr, atrazine, simazine, metribuzin, bromoxynil, bentazon, linuron, glufosinate, clomazone, isoxaflutole, topramezone, mesotrione, tembotrione, acifluorfen, formesafen, lactofen, flumiclorac, flumioxazin, fulfentrazone, carfentrazone, fluthiacet-ethyl, falufenacil, paraquat, ethalfluralin, pendimethalin, trifluralin, butylate, EPTC, ecetochlor, alachlor, metolachlor, dimethenamid, flufenacet, and pyroxasulfone.

A pesticide is a substance meant to prevent, destroy, or control pests including, but not limited to algae, bacteria, fungi, plants, insects, mites, snails, rodents, and viruses.

A pesticide intended for use against algae is known as an algicide. Examples of algicides include benzalkonium chloride, bethoxazin, cybutryne, dichlone, dichlorophen, diuron, endothal, fentin, isoproturon, methabenthiazuron, nabam, oxyfluorfen, pentachlorophenyl laurate, quinoclamine, quinonamid, simazine, terbutryn, and tiodonium.

A pesticide intended for use against bacteria is known as a bactericide. Examples of bactericides include antibiotics such as: aminoglycosides such as amikacin, gentamicin, kanamycin, neomycin, netilmicin, tobramycin, paromomycin, streptomycin, and spectinomycin; ansamycins such as geldanamycin, herbimycin, and rifaximin; carbacephems such as loracarbef; carbapenems such as ertapenem, doripenem, imipenem, and meropenem; cephalosporins such as cefadroxil, cefazolin, cephradine, cephapirin, cephalothin, cephalexin, cefaclor, cefoxitin, cefotetan, cefamandole, cefmetazole, cefonicid, cefprozil, cefuroxime, cefixime, cefdinir, cefditoren, cefoperazone, cefotaxime, cefpodoxime, cefazidime, ceftibuten, ceftizoxime, moxalactam, ceftriaxone, cefepime, cefaroline fosamil, and ceftobiprole; glycopeptides such as teicoplanin, vancomycin, telavancin, dalbavancin, and oritavancin; lincosamides such as clindamycin and lincomycin; lipopeptides such as daptomycin; macrolides such as azithromycin, clarithromycin, erythromycin, roxithromycin, telithromycin, spiramycin, and fidoxamicin; monobactams such as aztreonam; nitrofurans such as furazolidone and nitrofurantoin; oxazolidinones such as linezolid, posizolid, radezolid, and torezolid; penicillins such as amoxicillin, ampicillin, azlocillin, dicloxacillin, flucloxacillin, mezlocillin, methicillin, nafcillin, oxacillin, penicillins (including penicillin G and V), piperacillin, temocillin, and ticarcillin; polypeptides such as bacitracin, colistin, and polymyxin B; quinolones such as ciproflaxacin, enoxacin, gatifloxacin, gemifloxacin, levofloxacin, lomefloxacin, moxifloxacin, nadifloxacin, nalidixic acid, norfloxacin, ofloxacin, trovafloxacin, gepafloxacin, sparfloxacin, and temafloxacin; sulfonamides such as mafenide, sulfacetamide, sulfadiazine, sulfadithoxine, sulfamethizole, sulfamethoxazole, sulfanilamide, sulfasalazine, sulfisoxazole, and sulfonamidochrysoidine; tetracyclines such as demeclocycline, doxycycline, metacycline, minocycline, oxytetracycline, and tetracycline.

A pesticide intended for use against fungi is known as a fungicide. Examples of fungicides include acibenzolar, acypetacs, aldimorph, anilazine, aureofungin, azaconazole, azithiram, azoxystrobin, benalaxyl, benodanil, benomyl, benquinox, benthiavalicarb, binapacryl, biphenyl, bitertanol, bixafen, blasticidin-S, boscalid, bromuconazole, captafol, captan, carbendazim, carboxin, carpropamid, chloroneb, chlorothalonil, chlozolinate, cyazofamid, cymoxanil, cyprodinil, dichlofluanid, diclocymet, dicloran, diethofencarb, difenoconazole, diflumetorim, dimethachlone, dimethomorph, diniconazole, dinocap, dodemorph, edifenphos, enoxastrobin, epoxiconazole, etaconazole, ethaboxam, ethirimol, etridiazole, famoxadone, fenamidone, fenarimol, fenbuconazole, fenfuram, fenhexamid, fenoxanil, fenpropidin, fenpropimorph, ferbam, fluazinam, fludioxonil, flumorph, fluopicolide, fluopyram, fluoroimide, fluoxastrobin, flusilazole, flutianil, flutolain, flopet, fthalide, furalaxyl, guazatine, hexaconazole, hymexazole, imazalil, imibenconazole, iminoctadine, iodocarb, ipconazole, iprobenfos, iprodione, iprovalicarb, siofetamid, isoprothiolane, isotianil, kasugamycin, laminarin, mancozeb, mandestrobin, mandipropamid, maneb, mepanypyrim, mepronil, meptyldinocap, mealaxyl, metominostrobin, metconazole, methafulfocarb, metiram, metrafenone, myclobutanil, naftifine, nuarimol, octhilinone, ofurace, orysastrobin, oxadixyl, oxathiapiprolin, oxolinic acid, oxpoconazole, oxycarboxin, oxytetracycline, pefurazate, penconazole, pencycuron, penflufen, penthiopyrad, phenamacril, picarbutrazox, picoxystrobin, piperalin, polyoxin, probenzole, prochloraz, procymidone, propamocarb, propiconazole, propineb, proquinazid, prothiocarb, prothioconazole, pydiflumetofen, pyraclostrobin, pyrametostrobin, pyraoxystrobin, pyrazophos, pyribencarb, pyributicarb, pyrifenox, pyrimethanil, pyrimorph, pyriofenone, pyroquilon, quinoxyfen, quintozene, sedaxane, silthiofam, simeconazole, spiroxamine, streptomycin, tebuconazole, tebufloquin, teclofthalam, teenazene, terbinafine, tetraconazole, thiabendazole, thifluzamide, thiphanate, thiram, tiadinil, tolclosfos-methyl, folfenpyrid, tolprocarb, tolylfluanid, triadimefon, triadimenol, triazoxide, triclopyricarb, tricyclazole, tridemorph, trifloxystrobin, triflumizole, triforine, validamycin, and vinclozolin.

A pesticide intended for use against plants is known as an herbicide as described above.

A pesticide intended for use against insects is known as an insecticide. Examples of insecticides are: organochlorides such as Aldrin, chlordane, chlordecone, DDT, dieldrin, endofulfan, endrin, heptachlor, hexachlorobenzene, lindane, methoxychlor, mirex, pentachlorophenol, and TDE; organophosphates such as acephate, azinphos-methyl, bensulide, chlorethoxyfos, chlorpyrifos, diazinon, chlorvos, dicrotophos, dimethoate, disulfoton, ethoprop, fenamiphos, fenitrothion, fenthion, malathion, methamdophos, methidathion, mevinphos, monocrotophos, naled, omethoate, oxydemeton-methyl, parathion, phorate, phosalone, phosmet, phostebupirim, phoxim, pirimiphos-methyl, profenofos, terbufos, and trichlorfon; carbamates such as aldicarb, bendiocarb, carbofuran, carbaryl, dioxacarb, fenobucarb, fenoxycarb, isoprocarb, methomyl; pyrethroids such as allethrin, bifenthrin, cyhalothrin, cypermethrin, cyfluthrin, deltamethrin, etofenprox, fenvalerate, permethrin, phenothrin, prallethrin, resmethrin, tetramethrin, tralomethrin, and transfluthrin; neonicotinoids such as acetamiprid, clothiandin, imidacloprid, nithiazine, thiacloprid, and thiamethoxam; ryanoids such as chlorantraniliprole, cyanthaniliprole, and flubendiamide.

A pesticide intended for use against mites is known as a miticide. Examples of miticides are permethrin, ivermectin, carbamate insecticides as described above, organophosphate insecticides as described above, dicofol, abamectin, chlorfenapyr, cypermethrin, etoxazole, hexythiazox, imidacloprid, propargite, and spirotetramat.

A pesticide intended for use against snails and other mollusks is known as a molluscicide. Examples of molluscicides are metaldehyde and methiocarb.

A pesticide intended for use against rodents is known as a rodenticide. Examples of rodenticides are warfarin, coumatetralyl, difenacoum, brodifacoum, flocoumafen, bromadiolone, diphacinone, chlorophacinone, pindone, difethialone, cholecalciferol, ergocalciferol, ANTU, chloralose, crimidine, 1,3-difluoro-2-propanol, endrin, fluroacetamide, phosacetim, pyrinuron, scilliroside, strychnine, tetramethylenedisulfotetramine, bromethalin, 2,4-dinitrophenol, and uragan D2.

A pesticide intended for use against viruses is known as a virucide. Examples of virucides are cyanovirin-N, griffithsin, interferon, NVC-422, scytovirin, urumin, virkon, zonroz, and V-bind viricie.

A persistent organic pollutant is a toxic organic chemical that adversely affects human and environmental health, can be transported by wind and water, and can persist for years, decades, or centuries owing to resistance to environmental degradation by natural chemical, biological, or photolytic processes. Persistent organic pollutants are regulated by the United Nations Environment Programme 2001 Stockholm Convention on Persistent Organic Contaminants. Examples of persistent organic pollutants are Aldrin, chlordane, dieldrin, endrin, heptachlor, hexachlorobenzene, mirex, toxaphene, polychlorinated biphenyl (PCBs), dichlorodiphenyltrichloroethane (DDT), dioxins, polychlorinated dibenzofurans, chlordecone, hexachlorocyclohexane (α- and β-), hexabromodiphenyl ether, lindane, pentachlorobenzene, tetrabromodiphenyl ether, perfluorooctanesulfonic acid, endosulfans, and hexabromocyclododecane.

As used herein, the term 'heavy metals' refers to metals that are naturally occurring metallic elements with high density and atomic weight, often posing severe environmental and health risks due to their toxicity and persistence. Examples of heavy metals, include but are not limited to lead (Pb), mercury (Hg), cadmium (Cd), arsenic (As), chromium (Cr), and nickel (Ni).

According to a first aspect, the present disclosure relates to a $CaB_2O_4/Pb_3O_4/Mg_3B_2O_6/C$ nanocomposite.

In some embodiments, the $CaB_2O_4/Pb_3O_4/Mg_3B_2O_6/C$ nanocomposite includes $CaB_2O_4$.

The $CaB_2O_4$ may exist in a tetragonal phase and/or an orthorhombic phase. In some embodiments, the $CaB_2O_4/Pb_3O_4/Mg_3B_2O_6/C$ nanocomposite includes orthorhombic $CaB_2O_4$. In some embodiments, the $CaB_2O_4/Pb_3O_4/Mg_3B_2O_6/C$ nanocomposite is substantially free of tetragonal $CaB_2O_4$.

In some embodiments, the $CaB_2O_4/Pb_3O_4/Mg_3B_2O_6/C$ nanocomposite includes tetragonal $Pb_3O_4$. In some embodiments, the $CaB_2O_4/Pb_3O_4/Mg_3B_2O_6/C$ nanocomposite includes $Mg_3B_2O_6$. In some embodiments, $Mg_3B_2O_6$ may exist in the orthorhombic phase.

In some embodiments, the $CaB_2O_4/Pb_3O_4/Mg_3B_2O_6/C$ nanocomposite includes 55 to 70 at. % oxygen, based on a total number of atoms in the $CaB_2O_4/Pb_3O_4/Mg_3B_2O_6/C$ nanocomposite. In some embodiments, the $CaB_2O_4/Pb_3O_4/Mg_3B_2O_6/C$ nanocomposite includes 56 to 69 at. %, preferably 57 to 68 at. %, preferably 58 to 67 at. %, preferably 59 to 66 at. %, preferably 60 to 65 at. %, preferably 61 to 64 at. %, and preferably 62 to 63 at. % oxygen (O).

In some embodiments, the $CaB_2O_4/Pb_3O_4/Mg_3B_2O_6/C$ nanocomposite includes 5.0 to 12.5 at. % calcium based on a total number of atoms in the $CaB_2O_4/Pb_3O_4/Mg_3B_2O_6/C$ nanocomposite. In some embodiments, the $CaB_2O_4/Pb_3O_4/Mg_3B_2O_6/C$ nanocomposite includes 5.5 to 12.0 at. %, preferably 6.0 to 11.5 at. %, preferably 6.5 to 11.0 at. %, preferably 7.0 to 10.5 at. %, preferably 7.5 to 10.0 at. %, and preferably 8.0 to 9.5 at. % calcium (Ca).

In some embodiments, the $CaB_2O_4/Pb_3O_4/Mg_3B_2O_6/C$ nanocomposite includes 7.5 to 15 at. % magnesium based on a total number of atoms in the $CaB_2O_4/Pb_3O_4/Mg_3B_2O_6/C$ nanocomposite. In some embodiments, the $CaB_2O_4/Pb_3O_4/Mg_3B_2O_6/C$ nanocomposite includes 8.0 to 14.5 at. %, preferably 8.5 to 14.0 at. %, preferably 9.0 to 13.5 at. %, preferably 9.5 to 13.0 at. %, and preferably 10.0 to 12.5 at. % magnesium (Mg).

In some embodiments, the $CaB_2O_4/Pb_3O_4/Mg_3B_2O_6/C$ nanocomposite includes 7.5 to 15 at. % lead based on a total number of atoms in the $CaB_2O_4/Pb_3O_4/Mg_3B_2O_6/C$ nanocomposite. In some embodiments, the $CaB_2O_4/Pb_3O_4/Mg_3B_2O_6/C$ nanocomposite includes 8.0 to 14.5 at. %, preferably 8.5 to 14.0 at. %, preferably 9.0 to 13.5 at. %, preferably 9.5 to 13.0 at. %, and preferably 10.0 to 12.5 at. % lead (Pb).

In some embodiments, the $CaB_2O_4/Pb_3O_4/Mg_3B_2O_6/C$ nanocomposite includes 2.5 to 7.5 at. % boron based on a total number of atoms in the $CaB_2O_4/Pb_3O_4/Mg_3B_2O_6/C$ nanocomposite. In some embodiments, the $CaB_2O_4/Pb_3O_4/Mg_3B_2O_6/C$ nanocomposite includes 3.0 to 7.0 at. %, preferably 3.5 to 6.5 at. %, and preferably 4.0 to 6.0 at. % boron (B).

In some embodiments, the $CaB_2O_4/Pb_3O_4/Mg_3B_2O_6/C$ nanocomposite includes 2.5 to 7.5 at. % carbon based on a total number of atoms in the $CaB_2O_4/Pb_3O_4/Mg_3B_2O_6/C$ nanocomposite. In some embodiments, the $CaB_2O_4/Pb_3O_4/Mg_3B_2O_6/C$ nanocomposite includes 3.0 to 7.0 at. %, preferably 3.5 to 6.5 at. %, and preferably 4.0 to 6.0 at. % carbon (C).

In some embodiments, the $CaB_2O_4/Pb_3O_4/Mg_3B_2O_6/C$ nanocomposite includes 62.4 at. % O, 8.3 at. % Ca, 10.1 at. % Mg, 10.3 at. % Pb, 4.4 at. % B, and 4.5% C.

In some embodiments, the $CaB_2O_4/Pb_3O_4/Mg_3B_2O_6/C$ nanocomposite includes carbon. In some embodiments, the carbon is present isolated atoms or ions, clusters of atoms or ions, and/or present as complexes or groups comprising carbon. Such complexes or groups comprising carbon can be, for example, organic molecules incorporated into or present on a surface of the nanocomposite. In some embodiments, the carbon is present as interstitial dopant atoms in another material, such as the $CaB_2O_4$, the $Pb_3O_4$, and/or the $Mg_3B_2O_6$. In some embodiments, the carbon is present in the nanocomposite in the form of a carbon nanomaterial.

In general, the carbon nanomaterial may be any suitable carbon nanomaterial known to one of ordinary skill in the art. Examples of carbon nanomaterials include carbon nanotubes, carbon nanobuds, carbon nanoscrolls, carbon dots, activated carbon, carbon black, graphene, graphene oxide, reduced graphene oxide, and nanodiamonds. In some embodiments, the carbon is present as a carbon nanomaterial which is at least one selected from carbon nanotubes, carbon nanobuds, carbon nanoscrolls, carbon dots, activated carbon, carbon black, graphene, graphene oxide, reduced graphene oxide, and nanodiamonds.

In some embodiments, the carbon nanomaterial is carbon nanotubes. The carbon nanotubes may, in general, be any suitable carbon nanotubes known to one of ordinary skill in the art. Carbon nanotubes may be classified by structural properties such as the number of walls or the geometric configuration of the atoms that make up the nanotube. Classified by their number of walls, the carbon nanotubes can be single-walled carbon nanotubes (SWCNT) which have only one layer of carbon atoms arranged into a tube, or multi-walled carbon nanotubes (MWCNT), which have more than one single-layer tube of carbon atoms arranged so as to be nested, one tube inside another, each tube sharing a common orientation. Closely related to MWNTs are carbon nanoscrolls. Carbon nanoscrolls are structures similar in shape to a MWCNT, but made of a single layer of carbon atoms that has been rolled onto itself to form a multi-layered tube with a free outer edge on the exterior of the nanoscroll and a free inner edge on the interior of the scroll and open ends. The end-on view of a carbon nanoscroll has a spiral-like shape. For the purposes of this disclosure, carbon nanoscrolls are considered a type of MWCNT. Classified by the geometric configuration of the atoms that make up the nanotube, carbon nanotubes can be described by a pair of integer indices n and m. The indices n and m denote the number of unit vectors along two directions in the honeycomb crystal lattice of a single layer of carbon atoms. If m=0, the nanotubes are called zigzag type nanotubes. If n=m, the nanotubes are called armchair type nanotubes. Otherwise they are called chiral type nanotubes. In some embodiments, the carbon nanotubes are metallic. In other embodiments, the carbon nanotubes are semiconducting. In some embodiments, the carbon nanotubes are SWCNTs. In other embodiments, the carbon nanotubes are MWCNTs. In some embodiments, the carbon nanotubes are carbon nanoscrolls. In some embodiments, the carbon nanotubes are zigzag type nanotubes. In some embodiments, the carbon nanotubes are armchair type nanotubes. In other embodiments, the carbon nanotubes are chiral type nanotubes.

In some embodiments, the carbon nanomaterial is graphene. In some embodiments, the carbon nanomaterial is graphene nanosheets. Graphene nanosheets may consist of stacks of graphene sheets, the stacks having an average thickness and a diameter. In some embodiments, the stacks comprise 1 to 60 sheets of graphene, preferably 2 to 55 sheets of graphene, preferably 3 to 50 sheets of graphene.

In some embodiments, the graphene is in the form of graphene particles. The graphene particles may have a spherical shape, or may be shaped like blocks, flakes, ribbons, discs, granules, platelets, angular chunks, rectangular prisms, or some other shape. In some embodiments, the graphene particles may be substantially spherical, meaning that the distance from the graphene particle centroid (center of mass) to anywhere on the graphene outer surface varies by less than 30%, preferably by less than 20%, more preferably by less than 10% of the average distance. In some embodiments, the graphene particles may be in the form of agglomerates.

In some embodiments, the graphene is pristine graphene. Pristine graphene refers to graphene that has not been oxidized or otherwise functionalized. Pristine graphene may be obtained by methods such as exfoliation, chemical vapor deposition synthesis, opening of carbon nanotubes, unrolling of carbon nanoscrolls, and the like. In some embodiments, the graphene is functionalized graphene. Functionalized graphene is distinguished from pristine graphene by the presence of functional groups on the surface or edge of the graphene that contain elements other than carbon and hydrogen. In some embodiments, the graphene is graphene oxide. Graphene oxide refers to graphene that has various oxygen-containing functionalities that are not present in pristine graphene. Examples of such oxygen-containing functionalities include epoxides, carbonyl, carboxyl, and hydroxyl functional groups. Graphene oxide is sometimes considered to be a type of functionalized graphene.

In some embodiments, the graphene is reduced graphene oxide. Reduced graphene oxide (rGO) refers to graphene oxide that has been chemically reduced. It is distinct from graphene oxide in it contains substantially fewer oxygen-containing functionalities compared to graphene oxide, and it is distinct from pristine graphene by the presence of oxygen-containing functionalities and structural defects in the carbon network. Reduced graphene oxide is sometimes considered to be a type of functionalized graphene. In preferred embodiments, the carbon nanomaterial is reduced graphene oxide. The reduced graphene oxide may exist as nanosheets, particles having a spherical shape, or may be shaped like blocks, flakes, ribbons, discs, granules, platelets, angular chunks, rectangular prisms, or some other shape as described above, agglomerates as described above, or any other shape known to one of ordinary skill in the art.

In some embodiments, the carbon nanoparticles are activated carbon. Activated carbon refers to a form of porous carbon having a semi-crystalline, semi-graphitic structure and a large surface area. Activated carbon may be in the form of particles or particulate aggregates having micropores and/or mesopores. Activated carbon typically has a surface area of approximately 500 to 5000 $m^2/g$. The activated carbon particles may have a spherical shape, or may be shaped like sheets, blocks, flakes, ribbons, discs, granules, platelets, angular chunks, rectangular prisms, or some other shape. In some embodiments, the activated carbon particles may be substantially spherical, meaning that the distance from the activated carbon particle centroid (center of mass) to anywhere on the activated carbon particle outer surface varies by less than 30%, preferably by less than 20%, more preferably by less than 10% of the average distance.

In some embodiments, the carbon nanoparticles are carbon black. Carbon black refers to having a semi-crystalline, semi-graphitic structure and a large surface area. Carbon black may be distinguished from activated carbon by a comparatively lower surface area, typically 15 to 500 $m^2/g$ for carbon black. Additionally, carbon black may lack the requisite micropores and mesopores of activated carbon. The carbon black particles may have a spherical shape, or may be shaped like sheets, blocks, flakes, ribbons, discs, granules, platelets, angular chunks, rectangular prisms, or some other shape.

In some embodiments, the particles of a carbon nanomaterial are a single type of particle as described above. In this context, "a single type of particle" may refer to particles of a single carbon nanomaterial, particles which have substantially the same shape, particles which have substantially the same size, or any combination of these. In some embodiments, mixtures of types of particles are used.

In some embodiments, the carbon nanomaterial is present in the form of sheets having a mean thickness of 50 to 500 nm, preferably 60 to 475 nm, preferably 75 to 450 nm, preferably 100 to 425 nm, preferably 110 to 400 nm, preferably 125 to 375 nm, preferably 150 to 350 nm and a mean width of 500 to 5000 nm, preferably 550 to 4750 nm, preferably 600 to 4500 nm, preferably 650 to 4250 nm, preferably 700 to 4000 nm, preferably 750 to 3900 nm, preferably 800 to 3800 nm, preferably 850 to 3700 nm, preferably 900 to 3600 nm, preferably 950 to 3500 nm, preferably 1000 to 3400 nm.

In some embodiments, the sheets have a monodisperse thickness, having a coefficient of variation or relative standard deviation, expressed as a percentage and defined as the ratio of the sheet thickness standard deviation (σ) to the sheet thickness mean (μ), multiplied by 100%, of less than 25%, preferably less than 10%, preferably less than 8%, preferably less than 6%, preferably less than 5%. In a preferred embodiment, the sheets have a monodisperse thickness, having a size distribution ranging from 80% of the average thickness to 120% of the average thickness, preferably 85 to 115%, preferably 90 to 110% of the average thickness. In another embodiment, the sheets do not have a monodisperse thickness. In some embodiments, the sheets have a monodisperse diameter, having a coefficient of variation or relative standard deviation, expressed as a percentage and defined as the ratio of the sheet diameter standard deviation (a) to the sheet diameter mean (p), multiplied by 100%, of less than 25%, preferably less than 10%, preferably less than 8%, preferably less than 6%, preferably less than 5%. In a preferred embodiment, the sheets have a monodisperse diameter, having a size distribution ranging from 80% of the average diameter to 120% of the average diameter, preferably 85 to 115%, preferably 90 to 110% of the average diameter. In another embodiment, the sheets do not have a monodisperse diameter.

In some embodiments, the particles of a carbon nanomaterial are a single type of particle as described above. In this context, "a single type of particle" may refer to particles of a single carbon nanomaterial, particles which have substantially the same shape, particles which have substantially the same size, or any combination of these. In some embodiments, mixtures of types of particles are present.

In some embodiments, the $CaB_2O_4/Pb_3O_4/Mg_3B_2O_6/C$ nanocomposite has an average crystallite size of 40 to 90 nm. For example, the $CaB_2O_4/Pb_3O_4/Mg_3B_2O_6/C$ nanocomposite may have an average crystallite size of 40 nm, 42.5 nm, 45 nm, 47.5 nm, 50 nm, 52.5 nm, 55 nm, 57.5 nm, 60 nm, 62.5 nm, 65 nm, 67.5 nm, 70 nm, 72.5 nm, 75 nm, 77.5 nm, 80 nm, 82.5 nm, 85 nm, 87.5 nm, or 90 nm. The average crystallite size can be determined by XRD. In some embodiments, the $CaB_2O_4/Pb_3O_4/Mg_3B_2O_6/C$ nanocomposite has an average crystallite size of 63.15 nm, as determined by XRD. The average crystallite size of a nanomaterial can be estimated using XRD analysis by applying the Debye-Scherrer equation, and this method provides insight into the size of coherently diffracting crystalline domains within a material.

In some embodiments, the nanocomposite comprises nanoparticles. In some embodiments, the nanoparticles can include two or more of the $CaB_2O_4$, the $Pb_3O_4$, the $Mg_3B_2O_6$, and the carbon. For example, the nanoparticles can include the $CaB_2O_4$ and the $Pb_3O_4$, the $CaB_2O_4$ and the $Mg_3B_2O_6$, the $Pb_3O_4$ and the $Mg_3B_2O_6$, or other combinations. In some embodiments, the nanoparticles include all of the $CaB_2O_4$, the $Pb_3O_4$, the $Mg_3B_2O_6$, and the carbon. In some embodiments, the nanoparticles include multiple types of nanoparticles. Such types of nanoparticles can be distinguished by the composition (e.g., which phase(s) are present in the nanoparticles), by size, by shape, or some combination of these. For example, the nanoparticles can include separate $CaB_2O_4$ nanoparticles, $Pb_3O_4$ nanoparticles, $Mg_3B_2O_6$ nanoparticles, and carbon nanoparticles.

In general, the nanoparticles can be any shape known to one of ordinary skill in the art. Examples of suitable shapes the nanoparticles may take include spheres, spheroids, lentoids, ovoids, solid polyhedra such as tetrahedra, cubes, octahedra, icosahedra, dodecahedra, hollow polyhedra (also known as nanocages), stellated polyhedra (both regular and irregular, also known as nanostars), triangular prisms (also known as nanotriangles), hollow spherical shells (also known as nanoshells), tubes (also known as nanotubes), nanosheets, nanoplatelets, nanodisks, rods (also known as nanorods), belts (also known as nanobelts), ribbons (also known as nanoribbons), and mixtures thereof. In the case of nanorods, the rod shape may be defined by a ratio of a rod length to a rod width, the ratio being known as the aspect ratio. For nanoparticles of the current invention, nanorods should have an aspect ratio less than 1000, preferably less than 750, preferably less than 500, preferably less than 250, preferably less than 100, preferably less than 75, preferably less than 50, preferably less than 25.

In some embodiments, the nanoparticles (or type of nanoparticles) have a uniform shape. Alternatively, the shape may be non-uniform. As used herein, the term "uniform shape" refers to an average consistent shape that differs by no more than 10%, by no more than 5%, by no more than 4%, by no more than 3%, by no more than 2%, by no more than 1% of the distribution of nanoparticles (or type of nanoparticles) having a different shape. As used herein, the term "non-uniform shape" refers to an average consistent shape that differs by more than 10% of the distribution of nanoparticles having a different shape. In one embodiment, the shape is uniform and at least 90% of the nanoparticles (or type of nanoparticles) are spherical or substantially circular, and less than 10% are polygonal. In another embodiment, the shape is non-uniform and less than 90% of the nanoparticles are spherical or substantially circular, and greater than 10% are polygonal.

In some embodiments, the nanoparticles have a mean particle size of 100 to 2500 nm. For example, the nanoparticles may have a mean size of 100 nm, 150 nm, 200 nm, 250 nm, 300 nm, 350 nm, 400 nm, 450 nm, 500 nm, 550 nm, 600 nm, 650 nm, 700 nm, 750 nm, 800 nm, 850 nm, 900 nm, 950 nm, 1000 nm, 1125 nm, 1250 nm, 1375 nm, 1500 nm, 1625 nm, 1750 nm, 1875 nm, 2000 nm, 2125 nm, 2250 nm, 2375 nm, or 2500 nm. In embodiments where the nanoparticles are spherical, the particle size may refer to a particle diameter. In embodiments where the nanoparticles are polyhedral or some other non-spherical shape, the particle size may refer to the diameter of a circumsphere. In some embodiments, the particle size refers to a mean distance from a particle surface to particle centroid or center of mass. In alternative embodiments, the particle size refers to a maximum distance from a particle surface to a particle centroid or center of mass. In some embodiments where the nanoparticles have an anisotropic shape such as nanorods, the particle size may refer to a length of the nanorod, a width of the nanorod, or an average of the length and width of the nanorod. In some embodiments in which the nanoparticles have non-spherical shapes, the particle size refers to the diameter of a sphere having an equivalent volume as the particle. In some embodiments in which the nanoparticles have non-spherical shapes, the particle size refers to the diameter of a sphere having an equivalent diffusion coefficient as the particle.

In a preferred embodiment, the nanocomposite comprises rod-shaped particles. Rod-shaped particles are nanostructures characterized by an elongated cylindrical morphology, where their length is significantly greater than their width. These particles exhibit a high aspect ratio, which influences their physical, chemical, and optical properties. In some embodiments, the rod-shaped particles have a mean rod length of 0.25 to 2.5 micrometers (μm), preferably 0.50 to 2.25 μm, preferably 0.75 to 2.00 μm, preferably 1.00 to 1.75 μm, preferably 1.25 to 1.50 μm, and a mean rod diameter of 0.05 to 1 µm, preferably 0.15 to 0.90 µm, preferably 0.25 to 0.80 µm, preferably 0.35 to 0.70 µm, and preferably 0.45 to 0.60 µm.

In some embodiments, the nanocomposite comprises plate-shaped particles. Plate-shaped particles in nanocomposites are two-dimensional nanostructures characterized by a thin, flat morphology, where the lateral dimensions (length and width) are significantly larger than their thickness. Typically, these particles have a thickness ranging from a few nanometers to tens of nanometers, while their length and width can extend from hundreds of nanometers to several micrometers. In some embodiments, the plate-shaped particles have a mean plate length of 0.25 to 2.5 µm, preferably 0.50 to 2.25 µm, preferably 0.75 to 2.00 µm, preferably 1.00 to 1.75 µm, preferably 1.25 to 1.50 µm, a mean plate width of 0.25 to 2.5 µm, preferably 0.50 to 2.25 µm, preferably 0.75 to 2.00 µm, preferably 1.00 to 1.75 µm, preferably 1.25 to 1.50 µm, and a mean plate thickness of 0.05 to 1 µm, preferably 0.15 to 0.90 µm, preferably 0.25 to 0.80 µm, preferably 0.35 to 0.70 µm, and preferably 0.45 to 0.60 µm.

In some embodiments, the nanocomposite is in the form of aggregates. The aggregates can include any suitable combination of types of nanoparticles. For example, the aggregates can include the plate-shaped particles, the rod-shaped particles, other particles, or any combination of these.

In some embodiments, the nanoparticles of the present disclosure are monodisperse, having a coefficient of variation or relative standard deviation, expressed as a percentage and defined as the ratio of the particle size standard deviation (a) to the particle size mean (p) multiplied by 100 of less than 25%, preferably less than 10%, preferably less than 8%, preferably less than 6%, preferably less than 5%, preferably less than 4%, preferably less than 3%, preferably less than 2%. In some embodiments, the nanoparticles of the present disclosure are monodisperse having a particle size distribution ranging from 80% of the average particle size to 120% of the average particle size, preferably 90-110%, preferably 95-105% of the average particle size. In some embodiments, the nanoparticles are not monodisperse.

In general, the particle size may be determined by any suitable method known to one of ordinary skill in the art. In some embodiments, the particle size is determined by powder X-ray diffraction (PXRD). Using PXRD, the particle size may be determined using the Scherrer equation, which relates the full-width at half-maximum (FWHM) of diffraction peaks to the size of regions comprised of a single crystalline domain (known as crystallites) in the sample. In some embodiments, the crystallite size is the same as the particle size. For accurate particle size measurement by PXRD, the particles should be crystalline, comprise only a single crystal, and lack non-crystalline portions. Typically, the crystallite size underestimates particle size compared to other measures due to factors such as amorphous regions of particles, the inclusion of non-crystalline material on the surface of particles such as bulky surface ligands, and particles which may be composed of multiple crystalline domains. In some embodiments, the particle size is determined by dynamic light scattering (DLS). DLS is a technique which uses the time-dependent fluctuations in light scattered by particles in suspension or solution in a solvent, typically water to measure a size distribution of the particles. Due to the details of the DLS setup, the technique measures a hydrodynamic diameter of the particles, which is the diameter of a sphere with an equivalent diffusion coefficient as the particles. The hydrodynamic diameter may include factors not accounted for by other methods such as non-crystalline material on the surface of particles such as bulky surface ligands, amorphous regions of particles, and surface ligand-solvent interactions. Further, the hydrodynamic diameter may not accurately account for non-spherical particle shapes. DLS does have an advantage of being able to account for or more accurately model solution or suspension behavior of the particles compared to other techniques. In some embodiments, the particle size is determined by electron microscopy techniques such as scanning electron microscopy (SEM) or transmission electron microscopy (TEM).

Figure 1A:
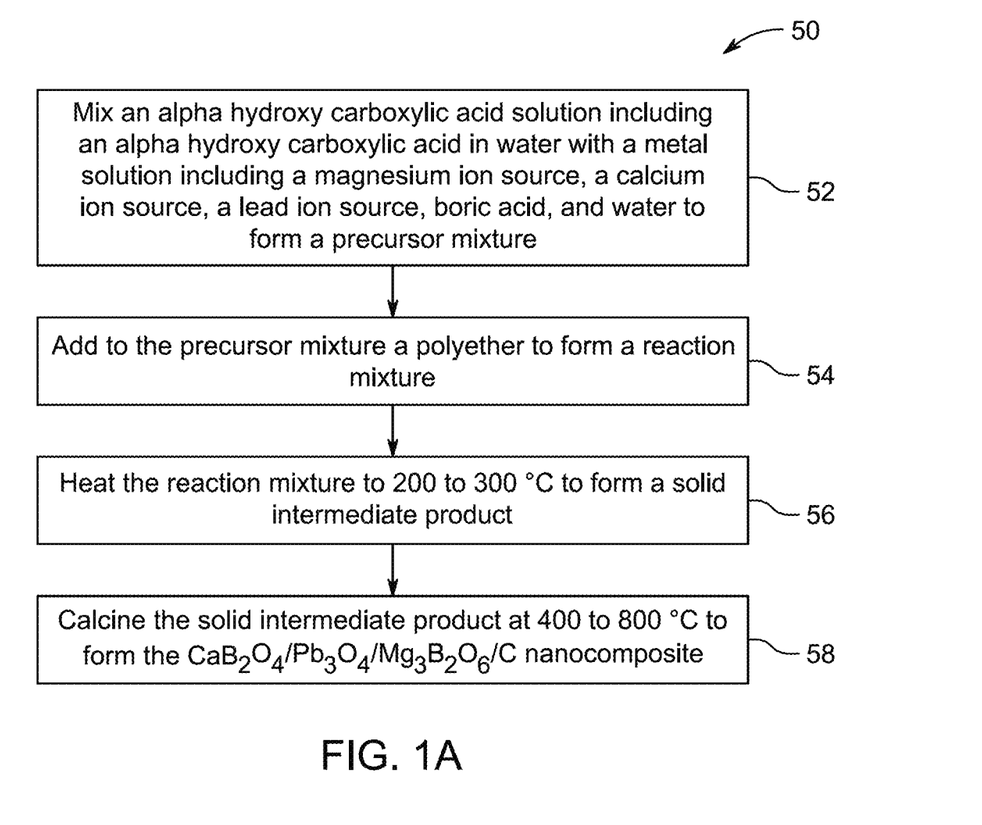
FIG. 1A illustrates an exemplary flow chart of a method of forming the $CaB_2O_4/Pb_3O_4/Mg_3B_2O_6/C$ nanocomposite, according to certain embodiments.

FIG. 1A illustrates a flow chart of a method 50 of preparing the $CaB_2O/Pb_3O/Mg_3B_2O_6/C$ nanocomposite. The order in which the method 50 is described is not intended to be construed as a limitation, and any number of the described method steps can be combined in any order to implement the method 50. Additionally, individual steps may be removed or skipped from the method 50 without departing from the spirit and scope of the present disclosure.

At step 52, the method 50 includes mixing an alpha hydroxy carboxylic acid solution including an alpha hydroxy carboxylic acid in water with a metal solution including a magnesium ion source, a calcium ion source, a lead ion source, boric acid ($H_3BO_3$), and water to form a precursor mixture. In general, the mixing may be performed manually or via stirring, swirling, mixing, sonication, or a combination thereof. The water may be tap water, distilled water, bidistilled water, deionized water, deionized distilled water, reverse osmosis water, and/or some other water. In some embodiments, the water is deionized water. In some embodiments, the water used is distilled water.

In some embodiments, the reaction mixture has a weight ratio of alpha hydroxy carboxylic acid to a total of the magnesium ion source, calcium ion source, and lead ion source of 0.25:1 to 1:1. For example, the weight ratio may be 0.25:1, 0.275:1, 0.30:1, 0.325:1, 0.35:1, 0.375:1, 0.40:1, 0.425:1, 0.45:1, 0.475:1, 0.50:1, 0.525:1, 0.55:1, 0.575:1, 0.60:1, 0.625:1, 0.65:1, 0.675:1, 0.70:1, 0.725:1, 0.75:1, 0.775:1, 0.80:1, 0.825:1, 0.85:1, 0.875:1, 0.90:1, 0.925:1, 0.95:1, 0.975:1, or 1.00:1. In some embodiments, the reaction mixture has a weight ratio of alpha hydroxy carboxylic acid to a total of the magnesium ion source, calcium ion source, and lead ion source of 0.55:1.

In general, the alpha hydroxy carboxylic acid can be any suitable alpha hydroxy carboxylic acid. Examples of suitable alpha-hydroxy carboxylic acids include, but are not limited to, lactic acid, glycolic acid, citric acid, malic acid, tartaric acid, acetic acid, mandelic acid, hydroxymalic acid, 2-hydroxybutyric acid, 3-hydroxybutyric acid, 4-hydroxybutyric acid, 2-hydroxypropanoic acid, 3-hydroxypropanoic acid, 2-hydroxyglutaric acid, 3-hydroxyglutaric acid, 2-hydroxyvaleric acid, 3-hydroxyvaleric acid, 4-hydroxyvaleric acid, hydroxyphenylacetic acid, 2-hydroxyisovaleric acid, 3-hydroxyisovaleric acid, hydroxyethanesulfonic acid, 2-hydroxyethylmalonic acid, 3-hydroxypropylcarboxylic acid, 4-hydroxybutane-1,2-dicarboxylic acid, 2-hydroxyacetic acid, 3-hydroxy-2,3-dimethylbutanoic acid, 3-hydroxy-2,2-dimethylpropanoic acid, and 2-hydroxyphenylpropionic acid. In some embodiments, the alpha hydroxy carboxylic acid is tartaric acid. In some embodiments, tartaric acid is D-tartaric acid, L-tartaric acid, achiral tartaric acid, or a racemic mixture of D- and L-tartaric acid forms.

In general, the magnesium ion source can be any suitable source of magnesium ions known to one of ordinary skill in the art. Examples of magnesium ion sources include, but are not limited to magnesium chloride ($MgCl_2$), magnesium sulfate ($MgSO_4$), magnesium carbonate ($MgCO_3$), magnesium nitrate ($Mg(NO_3)_2$), magnesium acetate ($Mg(C_2H_3O_2)_2$), magnesium hydroxide ($Mg(OH)_2$), magnesium phosphate ($Mg_3(PO_4)_2$), magnesium citrate ($C_6H_6MgO_7$), magnesium lactate ($C_6H_{11}MgO_6$), magnesium gluconate ($C_{11}H_{19}MgO_{11}$), magnesium hydrogen carbonate ($Mg(HCO_3)_2$). In some embodiment, the magnesium ion source is magnesium nitrate ($Mg(NO_3)_2$).

In general, the calcium ion source can be any suitable source of calcium ions known to one of ordinary skill in the art. Examples of calcium ion sources include, but are not limited to calcium chloride ($CaCl_2$), calcium sulfate ($CaSO_4$), calcium carbonate ($CaCO_3$), calcium nitrate ($Ca(NO_3)_2$), calcium acetate ($Ca(C_2H_3O_2)_2$), calcium hydroxide ($Ca(OH)_2$), calcium phosphate ($Ca_3(PO_4)_2$), calcium citrate ($C_6H_6CaO_7$), calcium lactate ($C_6H_{10}CaO_6$), calcium gluconate ($C_{12}H_{22}CaO_{14}$), and calcium hydrogen carbonate ($Ca(HCO_3)_2$). In some embodiments, the calcium ion source is calcium nitrate ($Ca(NO_3)_2$).

In general, the lead ion source can be any suitable source of lead ions known to one of ordinary skill in the art. Examples of lead ion sources include, but are not limited to lead chloride ($PbCl_2$), lead sulfate ($PbSO_4$), lead carbonate ($PbCO_3$), lead nitrate ($Pb(NO_3)_2$), lead acetate ($Pb(C_2H_3O_2)_2$), lead hydroxide ($Pb(OH)_2$), lead phosphate ($Pb_3(PO_4)_2$), lead citrate ($C_6H_6PbO_7$), lead lactate ($C_6H_{10}PbO_6$), lead gluconate ($C_{12}H_{22}PbO_{14}$), and lead hydrogen carbonate ($Pb(HCO_3)_2$). In some embodiments, the lead ion source is lead nitrate ($Pb(NO_3)_2$).

In some embodiments, the magnesium ion source is present in the reaction mixture in an amount of from 50 to 70 g/L, preferably 52 to 68 g/L, preferably 54 to 66 g/L, and preferably 56 to 64 g/L. In some embodiments, the concentration of the magnesium ion source in the reaction mixture is 57.14 g/L.

In some embodiments, the calcium ion source is present in the reaction mixture in an amount of from 50 to 70 g/L, preferably 52 to 68 g/L, preferably 54 to 66 g/L, and preferably 56 to 64 g/L. In some embodiments, the concentration calcium ion source the reaction mixture is 57.14 g/L.

In some embodiments, the lead ion source is present in the reaction mixture in an amount of from 50 to 70 g/L, preferably 52 to 68 g/L, preferably 54 to 66 g/L, and preferably 56 to 64 g/L. In some embodiments, the concentration of the lead ion source in the reaction mixture is 57.14 g/L.

In some embodiments, the reaction mixture has a weight ratio of the Mg ion source, Ca ion source, and Pb ion source of 1:1:1.

At step 54, the method 50 includes adding to the precursor mixture a polyether to form a reaction mixture. In some embodiments, the polyether may be selected from a variety of compounds, including but not limited to polyethylene glycol, polypropylene glycol, polytetramethylene glycol, polyvinyl alcohol, and alkyl polyglucosides.

In some embodiments, the polyether has a number average molecular weight of from about 200 to about 5000 g/mol. For example, the polyether may have a number average molecular weight of 200 g/mol, 250 g/mol, 300 g/mol, 350 g/mol, 400 g/mol, 450 g/mol, 500 g/mol, 550 g/mol, 600 g/mol, 650 g/mol, 700 g/mol, 750 g/mol, 800 g/mol, 850 g/mol, 900 g/mol, 950 g/mol, 1000 g/mol, 1250 g/mol, 1500 g/mol, 1750 g/mol, 2000 g/mol, 2250 g/mol, 2500 g/mol, 2750 g/mol, 3000 g/mol, 3250 g/mol, 3500 g/mol, 3750 g/mol, 4000 g/mol, 4250 g/mol, 4500 g/mol, 4750 g/mol, or 5000 g/mol. In a preferred embodiment, the polyether is polyethylene glycol having a mean molecular weight of 400 g/mol.

In some embodiments, the polyether may be present in the reaction mixture in a an amount of 30 to 50 milliliters per litre (mL/L), preferably 34 to 48 mL/L, preferably 38 to 46 mL/L, preferably 40 to 44 mL/L, preferably 42 to 43 mL/L. In some embodiments, the concentration of PEG 400 in the reaction mixture is 42.8 mL/L.

At step 56, the method 50 includes heating the reaction mixture to form a solid intermediate product. at a temperature of 200 to 300 degrees Celsius (° C.). For example, the heating may be performed at a temperature of 200° C., 205° C., 210° C., 215° C., 220° C., 225° C., 230° C., 235° C., 240° C., 245° C., 250° C., 255° C., 260° C., 265° C., 270° C., 275° C., 280° C., 285° C., 290° C., or 300° C. In some embodiments, the reaction mixture is heated to form a solid intermediate product at a temperature of 250° C. In some embodiments, the heating is performed until all the solvents have completely evaporated (e.g., to dryness). In general, the reaction mixture may be heated using any heating appliances such as ovens, microwaves, autoclaves, hot plates, heating mantles and tapes, oil baths, salt baths, sand baths, air baths, hot-tube furnaces, and hot-air guns.

At step 58, the method 50 includes calcining the solid intermediate product at 400 to 800° C. to form the $CaB_2O_4$/$Pb_3O_4$/$Mg_3B_2O_6$/C nanocomposite. For example, the solid intermediate product can be calcined at a temperature of 400° C., 425° C., 450° C., 475° C., 500° C., 525° C., 550° C., 575° C., 600° C., 625° C., 650° C., 675° C., 700° C., 725° C., 750° C., 775° C., or 800° C. In some embodiments, the solid intermediate product is calcined to form the $CaB_2O$/$Pb_3O_4$/$Mg_3B_2O_6$/C nanocomposite at a temperature of 600° C. The calcination of the powder may be carried out by heating it to a high temperature under a restricted supply of ambient oxygen. Typically, the calcination is carried out in a furnace preferably equipped with a temperature control system, which may provide a heating rate of up to 50° C. per minute (° C./min), preferably up to 40° C./min, preferably up to 30° C./min, preferably up to 20° C./min, preferably up to 10° C./min, preferably up to 5° C./min, preferably up to 2° C./min, and preferably up to 1° C./min.

The present disclosure also relates to a method of removing a pollutant from water. In some embodiments, the method includes contacting contaminated water with the nanocomposite and thereby forming a contaminated nanocomposite and further collecting a purified water. In some embodiments, the contaminated water refers to the water contaminated with one or more heavy meals and/or organic pollutants. The contaminated water may include, but is not limited to, polluted river water, groundwater tainted with pesticides and fertilizers, sewage-contaminated water in urban areas, oil-spilled water in oceans, and lakes contaminated with industrial chemicals. Sources of the contaminated water may include, but are not limited to, industrial discharges, agricultural runoff containing pesticides and fertilizers, untreated sewage from urban areas, oil spills from ships and rigs, leachate from landfills, and chemical waste from factories. Additionally, mining activities, deforestation, and improper disposal of household chemicals also contribute to water contamination. In some embodiments, the contaminated nanocomposite is further recovered via chemical or thermal or biodegradation to remove contaminated pollutants from the nanocomposite.

In some embodiments, the pollutant is an organic pollutant, which is at least one selected from a dye, a phenol, a polycyclic aromatic hydrocarbon, an herbicide, a pesticide, and a persistent organic pollutant. In some embodiments, the pollutant may be a heavy metal, which is at least on of lead, cadmium, arsenic, chromium, nickel, copper, and zinc.

In some embodiments, the contaminated water includes a pollutant in an amount of 0.01 to 10,000 parts per million (ppm). For example, the pollutant may be present in the contaminated water in an amount of 0.01 ppm, 0.025 ppm, 0.05 ppm, 0.075 ppm, 0.1 ppm, 0.25 ppm, 0.5 ppm, 0.75 ppm, 1 ppm, 1.25 ppm, 1.5 ppm, 1.75 ppm, 2 ppm, 2.5 ppm, 3 ppm, 3.5 ppm, 4 ppm, 4.5 ppm, 5 ppm, 5.5 ppm, 6 ppm, 6.5 ppm, 7 ppm, 7.5 ppm, 8 ppm, 8.5 ppm, 9 ppm, 9.5 ppm, 10 ppm, 12.5 ppm, 15 ppm, 17.5 ppm, 20 ppm, 22.5 ppm, 25 ppm, 27.5 ppm, 30 ppm, 35 ppm, 40 ppm, 45 ppm, 50 ppm, 75 ppm, 100 ppm, 125 ppm, 150 ppm, 175 ppm, 200 ppm, 250 ppm, 300 ppm, 350 ppm, 400 ppm, 450 ppm, 500 ppm, 550 ppm, 600 ppm, 650 ppm, 700 ppm, 750 ppm, 800 ppm, 850 ppm, 900 ppm, 950 ppm, 1000 ppm, 1250 ppm, 1500 ppm, 1750 ppm, 2000 ppm, 2250 ppm, 2500 ppm, 2750 ppm, 3000 ppm, 3250 ppm, 3500 ppm, 3750 ppm, 4000 ppm, 4250 ppm, 4500 ppm, 4750 ppm, 5000 ppm, 5250 ppm, 5500 ppm, 5750 ppm, 6000 ppm, 6250 ppm, 6500 ppm, 6750 ppm, 7000 ppm, 7250 ppm, 7500 ppm, 7750 ppm, 8000 ppm, 8250 ppm, 8500 ppm, 8750 ppm, 9000 ppm, 9250 ppm, 9500 ppm, 9750 ppm, or 10,000 ppm.

In some embodiments, the nanocomposite may be free flowing or supported on or within a substrate, for example, a column. Examples of supported nanocomposites include materials and geometries where the nanocomposite is supported within a fixed bed, a static packed bed, a fluidized bed, embedded in a porous support (such as a porous polymer matrix), in or on a ceramic support, in or on a polymer support, or in or on a silica support. In some embodiments, the nanocomposite is employed in an amount of 0.1 to 20 mg/mL, preferably 0.25 to 15 mg/mL, preferably 0.5 to 12.5 mg/mL, preferably 0.75 to 10 mg/mL, preferably 1 to 5 mg/mL of water to have a pollutant removed.

In some embodiments, the method involves addition of nanocomposite in powdered form to the water to have a pollutant be removed to form a purification mixture. In some embodiments, the purification mixture is shaken, stirred, agitated, or other method of achieving temporary homogeneity of the purification mixture. In some embodiments, the purification mixture is shaken at 10 to 1000 rpm, preferably 50 to 500 μm, preferably 125 to 250 rpm, preferably 150 rpm.

In some embodiments, the contacting comprises delivering a mixture into a feed side of a chamber comprising the nanocomposite in a supported form that divides the chamber into the feed side and a permeate side, such that at least a portion of the water permeates the nanocomposite and recovering from the permeate side purified water depleted in the contaminant compared to the water supplied to the feed side. The chamber used for the present method may be of any shape so long as the nanocomposite can be securely housed and utilized inside the chamber to accomplish the removal of the pollutant. The chamber may also include an inlet configured to accept feed material, a first outlet configured to expel a permeate, and an optional second outlet configured to expel a retentate. The chamber can be configured to be pressurized so as to push feed material though the inlet, permeate through the first outlet and optionally, retentate through the second outlet. The chamber can alternatively be configured to operate at reduced pressure as to pull feed material through the inlet, permeate out through the first outlet and optionally, retentate out through the second outlet. The chamber may also include a pump to provide a force for moving water from the feed side to the permeate side. In one or more embodiments, a force is provided to deliver the water into contact with the nanocomposite. The water may have a flow rate of 0.001 L/min to 1,000 L/min, 0.005 L/min to 500 L/min, 0.01 L/min to 100 L/min, 0.05 L/min to 10 L/min, 0.1 L/min to 5 L/min, or 0.5 L/min to 2 L/min. Alternatively, the water may stay stagnant over the nanocomposite or be stirred, shaken, or agitated as previously described.

In some embodiments, the water used in the method has a temperature of 1 to 99° C., preferably 20 to 90° C., preferably 21 to 75° C., preferably 25 to 50° C. In some embodiments, the water has a pH of 6.5 to 14, preferably 6.6 to 13, preferably 6.75 to 12, preferably 7 to 11. In some embodiments, the water and the nanocomposite are in contact for 1 to 120 minutes, preferably 5 to 105 minutes, preferably 10 to 90 minutes.

In some embodiments, the contacting is performed by passing the water through the nanocomposite. In some embodiments, the nanocomposite may be used in series with other currently known adsorption materials to enhance the removal of an organic pollutant or heavy metal from water or to remove a different type of impurity from water that is not an organic pollutant or heavy metal.

In terms of the present disclosure, the adsorption interaction between the pollutant and the nanocomposite may be chemisorption, physisorption, or mixtures thereof. In some embodiments, the pollutant is adsorbed onto the geopolymer composite via a physisorption process, meaning the process is primarily physical and preferably no chemical changes occur on the nanocomposite or pollutant.

In some embodiments, the method removes 70 to 99.9%, preferably 71 to 99%, preferably 73 to 97%, preferably 75 to 95%, preferably 77 to 93%, preferably 79 to 91%, preferably 81 to 89%, preferably 83 to 87%, preferably 85 to 86% of an initial amount of pollutant present in the contaminated water. In some embodiments, the purified water is substantially free of the pollutant, for example, the stream contains less than 10 ppm, preferably less than 1 ppm, preferably less than 100 ppb, preferably less than 1 ppb, preferably less than 0.1 ppb, preferably less than 1 ppt of the pollutant. In some embodiments, the purified water is devoid of the pollutant.

In some embodiments, the method further includes eluting the pollutant from the contaminated composite. The eluting can be performed by any suitable method and using any suitable materials known to one of ordinary skill in the art. In some embodiments, the eluting is performed by washing the nanocomposite which has adsorbed a pollutant with a suitable wash solvent. The wash solvent can be any suitable solvent, such as water, a surfactant solution, an organic solvent, or mixtures thereof. Suitable solvents of wash solvents include methanol, ethanol, n-propanol, n-butanol, iso-butanol and IPA. The water may be tap water, distilled water, bi-distilled water, deionized water, deionized distilled water, reverse osmosis water, and/or some other purified water. Washing may be helpful to remove pollutants and restore the effectiveness of the composite for reuse. The washing may take place with agitation, such as stirring or ultrasonication or may take place without agitation. Following the eluting, the nanocomposite may be referred to as a "regenerated nanocomposite". The nanocomposite of the present disclosure may be regenerated (i.e. eluted) and reused up to 2 cycles with a loss of no greater than 10 percent, preferably no greater than 9 percent, preferably no greater than 8 percent, preferably no greater than 7 percent, preferably no greater than 6 percent, preferably no greater than 5 percent, preferably no greater than 4 percent, preferably no greater than 3 percent, preferably no greater than 2 percent, preferably no greater than 1 percent in a pollutant uptake capacity, preferably up to 15 cycles, preferably up to 25 cycles, preferably up to 50 cycles, preferably up to 100 cycles, preferably up to 150 cycles, preferably up to 200 cycles, preferably up to 250 cycles, preferably up to 300 cycles, preferably up to 350 cycles, preferably up to 400 cycles, preferably up to 500 cycles, preferably up to 625 cycles, preferably up to 750 cycles, preferably up to 1,000 cycles. The nanocomposite of the present disclosure may be regenerated (i.e. eluted) and reused up to 2 cycles with a loss of no greater than 10 percent, preferably no greater than 9 percent, preferably no greater than 8 percent, preferably no greater than 7 percent, preferably no greater than 6 percent, preferably no greater than 5 percent, preferably no greater than 4 percent, preferably no greater than 3 percent, preferably no greater than 2 percent, preferably no greater than 1 percent in the pure water flux, preferably up to 15 cycles, preferably up to 25 cycles, preferably up to 50 cycles, preferably up to 100 cycles, preferably up to 150 cycles, preferably up to 200 cycles, preferably up to 250 cycles, preferably up to 300 cycles, preferably up to 350 cycles, preferably up to 400 cycles, preferably up to 500 cycles, preferably up to 625 cycles, preferably up to 750 cycles, preferably up to 1,000 cycles.

EXAMPLES

The following examples demonstrate a $CaB_2O_4/Pb_3O_4/Mg_3B_2O_6/C$ nanocomposite (herein referred to as a nanocomposite). The examples are provided solely for illustration and are not to be construed as limitations of the present disclosure, as many variations thereof are possible without departing from the spirit and scope of the present disclosure.

Figure 1B:
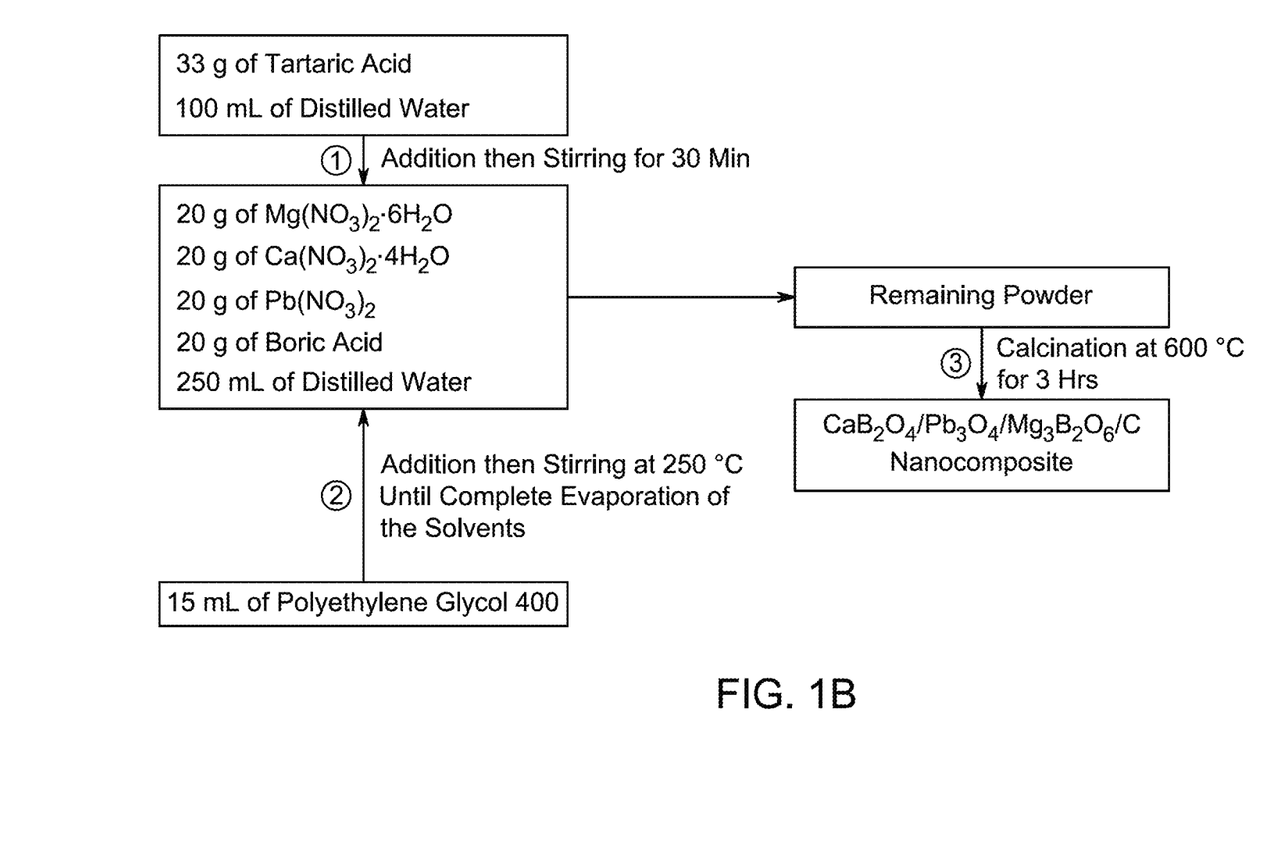
FIG. 1B shows the experimental steps for the production of the $CaB_2O_4/Pb_3O_4/Mg_3B_2O_6/C$ nanocomposite, according to certain embodiments.

Example 1: Synthesis of $CaB_2O_4/Pb_3O_4/Mg_3B_2O_6/C$ Nanocomposite Using Pechini Sol-Gel Method To synthesize the $CaB_2O_4/Pb_3O_4/Mg_3B_2O_6/C$ nanocomposite via the Pechini sol-gel method, 33 grams (g) of tartaric acid ($C_4H_6O_6$) were dissolved in 100 milliliters (mL) of distilled water. Separately, 20 g each of magnesium nitrate hexahydrate ($Mg(NO_3)_2 \cdot 6H_2O$), calcium nitrate tetrahydrate ($Ca(NO_3)_2 \cdot 4H_2O$), lead nitrate ($Pb(NO_3)_2$), and boric acid ($H_3BO_3$) were dissolved in 250 mL of distilled water. The $C_4H_6O_6$ solution was then added to the metal nitrate and $H_3BO_3$ solution, with continuous stirring for 30 minutes (min). Subsequently, 15 mL of polyethylene glycol 400 was introduced into the mixture, which was continuously stirred at 250 degrees Celsius (° C.) until complete evaporation of the solvents occurred. The resulting powder was calcined at 600° C. for 3 hours (h) to yield the $CaB_2O_4/Pb_3O_4/Mg_3B_2O_6/C$ nanocomposite, as illustrated in FIG. 1B.

Example 2: Nanocomposite Characterization

Figure 2:
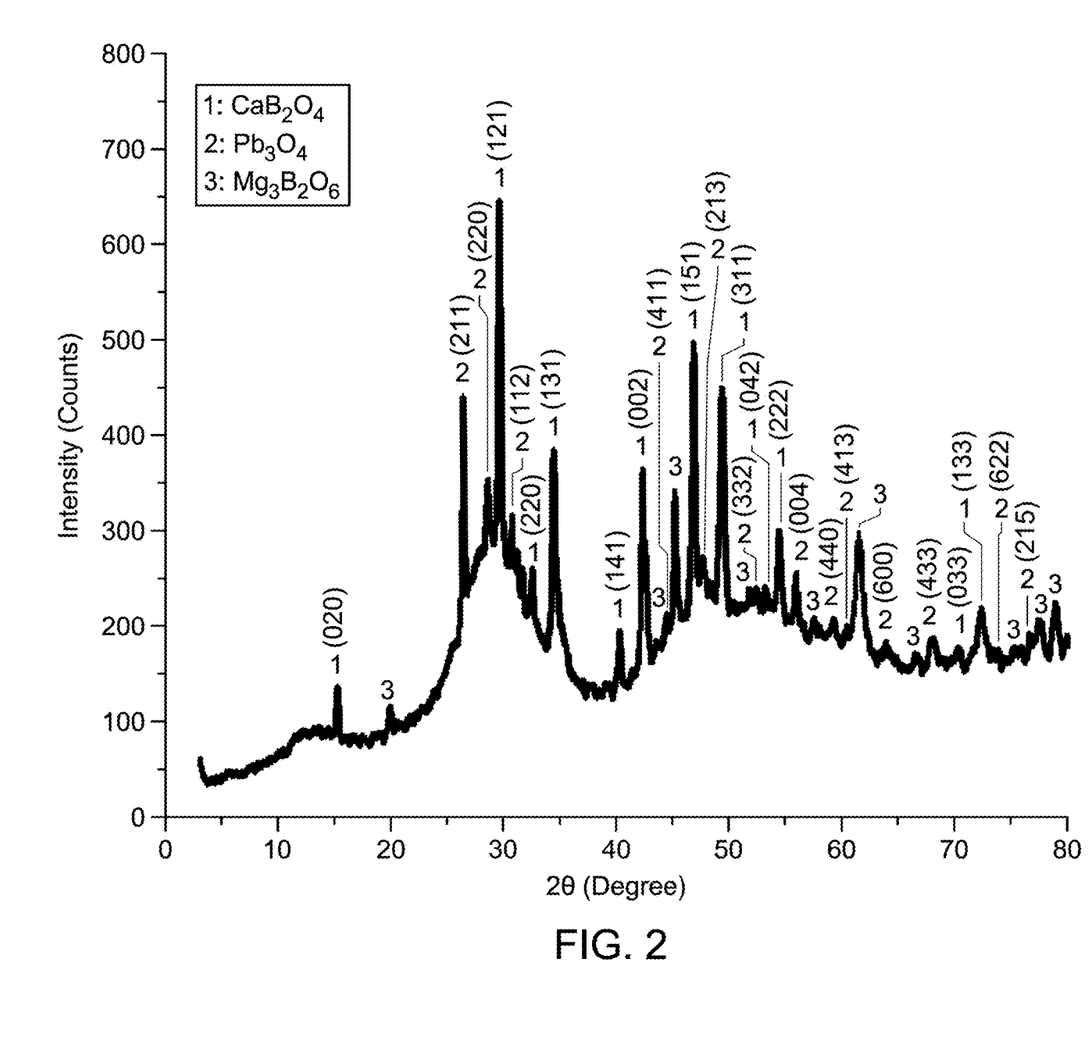
FIG. 2 shows an X-ray diffraction (XRD) pattern of the $CaB_2O_4/Pb_3O_4/Mg_3B_2O_6/C$ nanocomposite, according to certain embodiments.

The X-ray diffraction (XRD) pattern of the nanocomposite is shown in FIG. 2, and the structural and crystallographic properties are summarized in Table 1. The nanocomposite consists of three main phases: calcium metaborate ($CaB_2O_4$) with joint committee on powder diffraction standards (JCPDS) card number JCPDS-00-018-0281 and an orthorhombic crystal system, lead tetroxide ($Pb_3O_4$) with card number JCPDS-00-008-0019 and a tetragonal crystal system, and magnesium borate ($Mg_3B_2O_6$) with card number JCPDS-00-001-0988. The diffraction peaks for $CaB_2O_4$ were observed at 2θ angles of 15.21°, 29.69°, 32.52°, 34.42°, 40.18°, 42.17°, 46.80°, 49.32°, 53.09°, 54.35°, 70.29°, and 72.30°, corresponding to the Miller indices (020), (121), (220), (131), (141), (002), (151), (311), (042), (222), (033), and (133), respectively. The diffraction peaks for $Pb_3O_4$ appeared at 2θ angles of 26.43°, 28.64°, 30.73°, 44.38°, 47.64°, 52.26°, 55.81°, 59.08°, 60.43°, 63.89°, 68.09°, 73.56°, and 76.49°, which correspond to the Miller indices (211), (220), (112), (411), (213), (332), (004), (440), (413), (600), (433), (622), and (215), respectively. The peaks for $Mg_3B_2O_6$ were observed at 2θ angles of 19.83°, 43.43°, 45.11°, 51.73°, 57.49°, 61.49°, 66.41°, 75.24°, 77.43°, and 78.79°. The average crystallite size of the nanocomposite was 63.15 nanometers (nm).

TABLE 1

Structural and crystallographic properties of the $CaB_2O_4/Pb_3O_4/Mg_3B_2O_6/C$ nanocomposite components as determined by XRD.

| Components of the nanocomposite | | | | Average crystallite size of nanocomposite (nm) |
|---|---|---|---|---|
| Phase | Chemical name | Card No. | Crystal system | |
| $CaB_2O_4$ | Calcium borate | JCPDS-00-018-0281 | Orthorhombic | 63.15 |
| $Pb_3O_4$ | Lead oxide | JCPDS-00-008-0019 | Tetragonal | |
| $Mg_3B_2O_6$ | Magnesium borate | JCPDS-00-001-0988 | Not yet known | |

Figure 3:
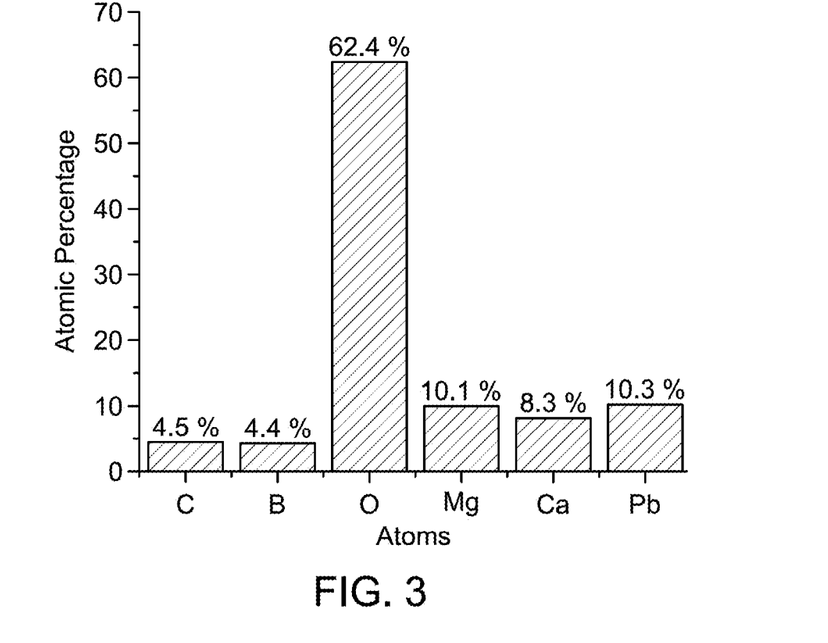
FIG. 3 shows an atomic percentage distribution of elements in the $CaB_2O_4/Pb_3O_4/Mg_3B_2O_6/C$ nanocomposite as determined by energy-dispersive X-ray spectroscopy (EDX), according to certain embodiments.

FIG. 3 shows the atomic percentages of elements in the nanocomposite as determined by energy-dispersive X-ray (EDX) analysis. The results show that oxygen (O) constituted the highest atomic percent (at. %) of 62.4%, followed by lead (Pb) of 10.3 at. %, magnesium (Mg) of 10.1 at. %, calcium (Ca) of 8.3 at. %, carbon (C) of 4.5 at. %, and boron (B) of 4.4 at. %. The presence of C in the nanocomposite can be attributed to the use of $C_4H_6O_6$ and polyethylene glycol 400 during the synthesis process via the Pechini sol-gel method, where these organic compounds act as chelating and dispersing agents, which are converted to carbon after thermal decomposition.

Figure 4:
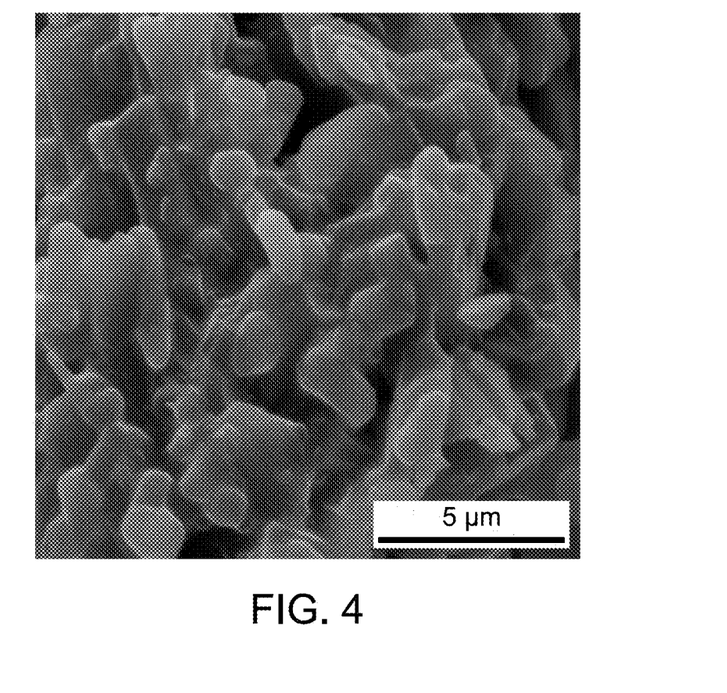
FIG. 4 shows a scanning electron microscope (SEM) image of the $CaB_2O_4/Pb_3O_4/Mg_3B_2O_6/C$ nanocomposite, according to certain embodiments.

FIG. 4 shows a scanning electron microscope (SEM) image of the nanocomposite. The SEM analysis revealed the morphology of the nanocomposite, showing irregularly shaped particles with a combination of rod-like and plate-like structures distributed throughout the surface. These structures indicate the heterogeneous nature of the nanocomposite material.

The $CaB_2O_4/Pb_3O_4/Mg_3B_2O_6/C$ nanocomposite was successfully synthesized using the Pechini sol-gel method, which uses tartaric acid and polyethylene glycol 400 as chelating and dispersing agents. The $CaB_2O_4/Pb_3O_4/Mg_3B_2O_6/C$ nanocomposite showed good phase integration. The successful integration of calcium metaborate ($CaB_2O_4$), lead tetroxide ($Pb_3O_4$), magnesium borate ($Mg_3B_2O_6$), and carbon (C) yielded a precisely engineered nanocomposite with diverse morphology and multi-component integration. The synergistic effects of the various phases may be advantageous for making this nanocomposite useful in applications in energy storage, catalysis, biomedicine, and environmental sustainability. The nanocomposite of the present disclosure has potential commercial applications in advanced water treatment systems, where its multi-phase composition can efficiently remove heavy metals and organic pollutants. It can also be utilized in energy storage devices such as batteries and supercapacitors due to its stable and well-defined crystalline structure. Furthermore, the nanocomposite is suitable for catalytic applications in chemical synthesis and industrial processes, leveraging its unique material properties.

Numerous modifications and variations of the present disclosure are possible in light of the above teachings. It is therefore to be understood that within the scope of the appended claims, the invention may be practiced otherwise than as specifically described herein.

The invention claimed is:

1. A $CaB_2O_4/Pb_3O_4/Mg_3B_2O_6/C$ nanocomposite, comprising
orthorhombic $CaB_2O_4$;
tetragonal $Pb_3O_4$;
$Mg_3B_2O_6$; and
carbon, wherein
the $CaB_2O_4/Pb_3O_4/Mg_3B_2O_6/C$ nanocomposite comprises
55 to 70 atom % oxygen;
5.0 to 12.5 atom % calcium;
7.5 to 15 atom % magnesium;
7.5 to 15 atom % lead;
2.5 to 7.5 atom % boron; and
2.5 to 7.5 atom % carbon, each based on a total number of atoms in the $CaB_2O_4/Pb_3O_4/Mg_3B_2O_6/C$ nanocomposite.

2. The $CaB_2O_4/Pb_3O_4/Mg_3B_2O_6/C$ nanocomposite of claim 1, having an average crystallite size of 40 to 90 nm by XRD.

3. The $CaB_2O_4/Pb_3O_4/Mg_3B_2O_6/C$ nanocomposite of claim 1, wherein the $CaB_2O_4/Pb_3O_4/Mg_3B_2O_6/C$ nanocomposite is in the form of aggregates including rod-shaped particles.

4. The $CaB_2O_4/Pb_3O_4/Mg_3B_2O_6/C$ nanocomposite of claim 3, wherein the rod-shaped particles have a mean rod length of 0.25 to 2.5 μm and a mean rod diameter of 0.05 to 1 μm.

5. The $CaB_2O_4/Pb_3O_4/Mg_3B_2O_6/C$ nanocomposite of claim 1, wherein the $CaB_2O_4/Pb_3O_4/Mg_3B_2O_6/C$ nanocomposite is in the form of aggregates including plate-shaped particles.

6. The $CaB_2O_4/Pb_3O_4/Mg_3B_2O_6/C$ nanocomposite of claim 5, wherein the plate-shaped particles have a mean plate length of 0.25 to 2.5 μm, a mean plate width of 0.25 to 2.5 μm, and a mean plate thickness of 0.05 to 1 μm.

7. The $CaB_2O_4/Pb_3O_4/Mg_3B_2O_6/C$ nanocomposite of claim 1, wherein the carbon is present as a carbon nanomaterial which is at least one selected from the group consisting of carbon nanotubes, carbon nanobuds, carbon nanoscrolls, carbon dots, activated carbon, carbon black, graphene, graphene oxide, reduced graphene oxide, and nanodiamonds.

8. A method of forming the $CaB_2O_4/Pb_3O_4/Mg_3B_2O_6/C$ nanocomposite of claim 1, the method comprising
mixing an alpha hydroxy carboxylic acid solution comprising an alpha hydroxy carboxylic acid in water with a metal solution comprising a magnesium ion source, a calcium ion source, a lead ion source, boric acid and water to form a precursor mixture;
adding to the precursor mixture a polyether to form a reaction mixture;
heating the reaction mixture to 200 to 300° C. to form a solid intermediate product; and
calcining the solid intermediate product at 400 to 800° C. to form the $CaB_2O_4/Pb_3O_4/Mg_3B_2O_6/C$ nanocomposite.

9. The method of claim 8, wherein the alpha hydroxy carboxylic acid is tartaric acid.

10. The method of claim 8, wherein the magnesium ion source is magnesium nitrate.

11. The method of claim 8, wherein the calcium ion source is calcium nitrate.

12. The method of claim 8, wherein the lead ion source is lead nitrate.

13. The method of claim 8, wherein the polyether is polyethylene glycol having a mean molecular weight of 400 g/mol.

14. The method of claim 8, wherein the reaction mixture has a weight ratio of tartaric acid to a total of the magnesium ion source, calcium ion source, and lead ion source of 0.25:1 to 1:1.

15. A method of removing a pollutant from water, the method comprising
contacting a contaminated water with the $CaB_2O_4/Pb_3O_4/Mg_3B_2O_6/C$ nanocomposite of claim 1 thereby forming a contaminated nanocomposite; and
collecting a purified water.

16. The method of claim 15, wherein the pollutant is an organic pollutant which is at least one selected from the group consisting of a dye, a phenol, a polycyclic aromatic hydrocarbon, an herbicide, and a pesticide.

17. The method of claim 16, wherein the pollutant is present in the contaminated water in an amount of 0.01 to 10,000 ppm.

18. The method of claim 16, wherein the method removes 70 to 99.9% of an initial amount of the pollutant present in the contaminated water.

19. The method of claim 15, wherein the pollutant is a heavy metal which is at least one selected from the group consisting of lead, cadmium, arsenic, chromium, nickel, copper, and zinc.

* * * * *